(12) United States Patent
Roetker (10) Patent No.: US 9,671,130 B2
(45) Date of Patent: Jun. 6, 2017

(54) SORPTION HEAT PUMP WATER HEATER

(71) Applicant: General Electric Company, Schenectady, NY (US)

(72) Inventor: John Joseph Roetker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/373,913

(22) PCT Filed: Oct. 9, 2013

(86) PCT No.: PCT/US2013/064026
§ 371 (c)(1),
(2) Date: Jul. 23, 2014

(87) PCT Pub. No.: WO2015/053762
PCT Pub. Date: Apr. 16, 2015

(65) Prior Publication Data
US 2016/0231021 A1 Aug. 11, 2016

(51) Int. Cl.
| F24H 9/20 | (2006.01) |
| F24H 4/04 | (2006.01) |
| F25B 17/02 | (2006.01) |
| F25B 30/04 | (2006.01) |

(52) U.S. Cl.
CPC .............. *F24H 4/04* (2013.01); *F24H 9/2007* (2013.01); *F25B 17/02* (2013.01); *F25B 30/04* (2013.01); *F25B 2339/047* (2013.01); *Y02B 30/62* (2013.01)

(58) Field of Classification Search
CPC ..................................................... Y02E 10/44
USPC .......................................................... 126/400
See application file for complete search history.

(56) References Cited

U.S. PATENT DOCUMENTS

| 4,293,323 A * | 10/1981 | Cohen ................... F25B 29/003 165/142 |
| 4,363,221 A | 12/1982 | Singh |
| 4,364,239 A | 12/1982 | Chapelle et al. |
| 4,596,122 A | 6/1986 | Kantner |

(Continued)

FOREIGN PATENT DOCUMENTS

GB          2130713 A      6/1984

OTHER PUBLICATIONS

PCT International Search Report for PCT/US13/64026; Mailed May 1, 2014.

*Primary Examiner* — Avinash Savani
(74) *Attorney, Agent, or Firm* — Dority & Manning, P.A.

(57) ABSTRACT

A water heater that can be operated with improved efficiency is provided. The water heater uses a thermally activated sorption heat pump to heat water stored in a tank. A sorbate is endothermically desorbed from a refrigerant, which in turn is released as a gas or vapor. The latent heat of condensing this refrigerant vapor to a liquid is transferred directly to the water in the tank. Ambient air is then used to vaporize the refrigerant liquid. The vapor refrigerant is then exothermically absorbed by the sorbate. The heat released by this absorption is transferred to the water in the tank using a heat transfer fluid. The cycle can then be repeated by desorbing the sorbate again to release the refrigerant as vapor. A heat source is used to provide heat energy to endothermically desorb the sorbate.

20 Claims, 7 Drawing Sheets

(56) References Cited

U.S. PATENT DOCUMENTS

| | | | |
|---|---|---|---|
| 4,910,969 A * | 3/1990 | Dalin | F02G 5/02 |
| | | | 237/2 B |
| 5,272,891 A | 12/1993 | Erickson | |
| 2002/0194990 A1 * | 12/2002 | Wegeng | B01D 53/06 |
| | | | 95/114 |
| 2006/0101847 A1 * | 5/2006 | Henning | F25B 17/08 |
| | | | 62/480 |
| 2010/0281899 A1 | 11/2010 | Garrabrant | |
| 2012/0000221 A1 | 1/2012 | Abdelaziz et al. | |

\* cited by examiner

SORPTION HEAT PUMP WATER HEATER

FIELD OF THE INVENTION

The subject matter of the present disclosure relates generally to a water heater that uses a thermally activated sorption heat pump to provide heat to the water.

BACKGROUND OF THE INVENTION

Water heaters can provide for the heating and storage of water to be used in e.g., a residential or commercial structure. A typical construction includes a water tank that is surrounded by a jacket and is insulated. A heat source is provided for increasing the temperature of water in the tank. The heat energy is commonly supplied e.g., by gas burners or electrically-resistant coils.

In such constructions, heat created from combustion or the resistance to a current flow is provided directly to the water tank. With gas burners, for example, the burner is located just below the bottom wall of the water tank. Combustion of a liquid or gaseous fuel provides heat that is conducted through the wall of the water tank. In the case of electrically-resistant coils, one or more such coils are typically inserted through a wall of the tank and into the water. Heat generated by the resistance to current flow is transferred to the water. While substantial improvements have been achieved, there is still a need for improvement in water heater efficiency.

BRIEF DESCRIPTION OF THE INVENTION

The present invention provides a water heater that can be operated with improved efficiency. The water heater uses a thermally activated sorption heat pump to heat water stored in a tank. A sorbate is endothermically desorbed from a refrigerant, which in turn is released as a gas or vapor. The latent heat of condensing this refrigerant vapor to a liquid is transferred directly to the water in the tank. Ambient air is then used to vaporize the refrigerant liquid. The vapor refrigerant is then exothermically absorbed by the sorbate. The heat released by this absorption is transferred to the water in the tank using a heat transfer fluid. The cycle can then be repeated by desorbing the sorbate again to release the refrigerant as vapor. A heat source is used to provide heat energy to endothermically desorb the sorbate. Features can be provided to further improve efficiency by capturing additional heat from the heat source. Additional aspects and advantages of the invention will be set forth in part in the following description, or may be apparent from the description, or may be learned through practice of the invention.

In one exemplary embodiment, a water heater is provided that includes a tank for holding water and a sorption heat pump. The sorption heat pump includes a condensate collection chamber, a regenerator in fluid communication with the condensate collection chamber, a sorbate located in the regenerator, a condenser positioned in the tank that is in fluid communication with the condensate collection chamber and is also configured for exchanging heat with water in the tank, and an evaporator in fluid communication with the condensate collection chamber. A heat source is positioned proximate to the regenerator and is configured for selectively applying heat to the regenerator. A heat transfer loop is provided that includes a first heat exchanger positioned in the tank and configured for delivering heat energy to water in the tank. The loop also includes a second heat exchanger positioned proximate to the regenerator and the heat source and is configured for receiving heat energy from the regenerator, the heat source, or both. The loop also includes a pump for circulating a heat transfer fluid between the first and second heat exchangers.

In another aspect, the present invention provides a method of operating a water heater, the water heater having a tank for holding water, a regenerator for a sorbate, and an evaporator. The method includes the steps of applying heat to the regenerator so as to heat a solution containing the sorbate and provide a refrigerant vapor; exchanging heat between the refrigerant vapor and water in the tank so as to increase the temperature of water in the tank; condensing the refrigerant vapor into a refrigerant liquid; draining the refrigerant liquid under force of gravity to the evaporator; vaporizing the refrigerant liquid in the evaporator to provide a refrigerant vapor by exchanging heat energy between the refrigerant liquid and ambient air; combining the refrigerant vapor from the step of vaporizing with the sorbate so as to regenerate the sorbate solution by an exothermic reaction; circulating a heat transfer fluid during between the regenerator and the water tank after the step of applying and during the step of combining; and terminating the step of circulating when the difference in temperature between the heat transfer fluid and the water in the tank is less than a predetermined temperature difference.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, each of which are schematic representations in which:

FIG. 1 illustrates an exemplary embodiment of a water heater of the present invention in charging mode while FIG. 2 illustrates a discharge mode. An exemplary system for heat pump is illustrated. Certain features are not shown until later figures for purposes of additional clarity in describing the invention.

The use of the same reference numerals throughout the figures indicates the same features.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An exemplary embodiment of a water heater 200 of the present invention is shown schematically in FIGS. 1 through 7. For purposes of clarity in describing the invention, certain features are illustrated in some drawings while not repeated in others. As will be understood using the description that follows, this exemplary embodiment of water heater 200 includes all of the features shown in FIGS. 1 through 7.

Figure 1:
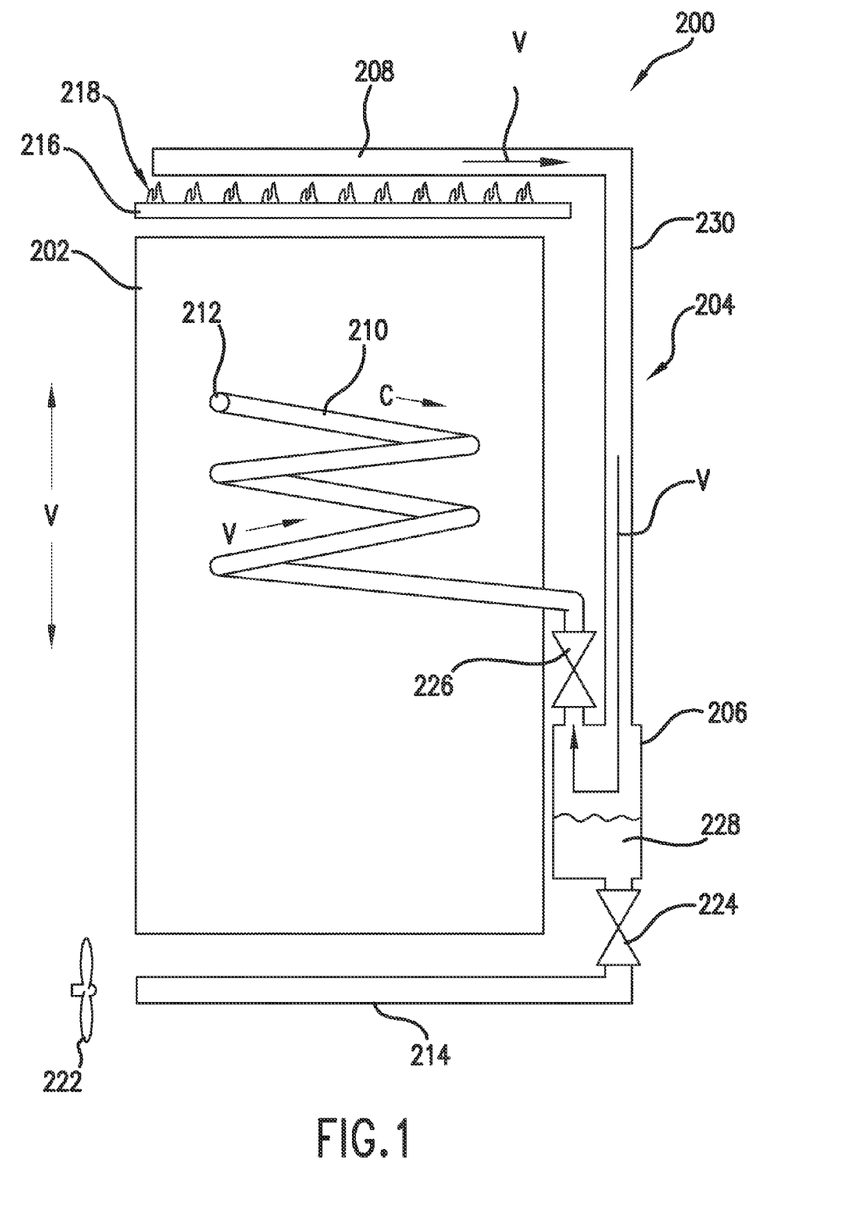
Figure 2:
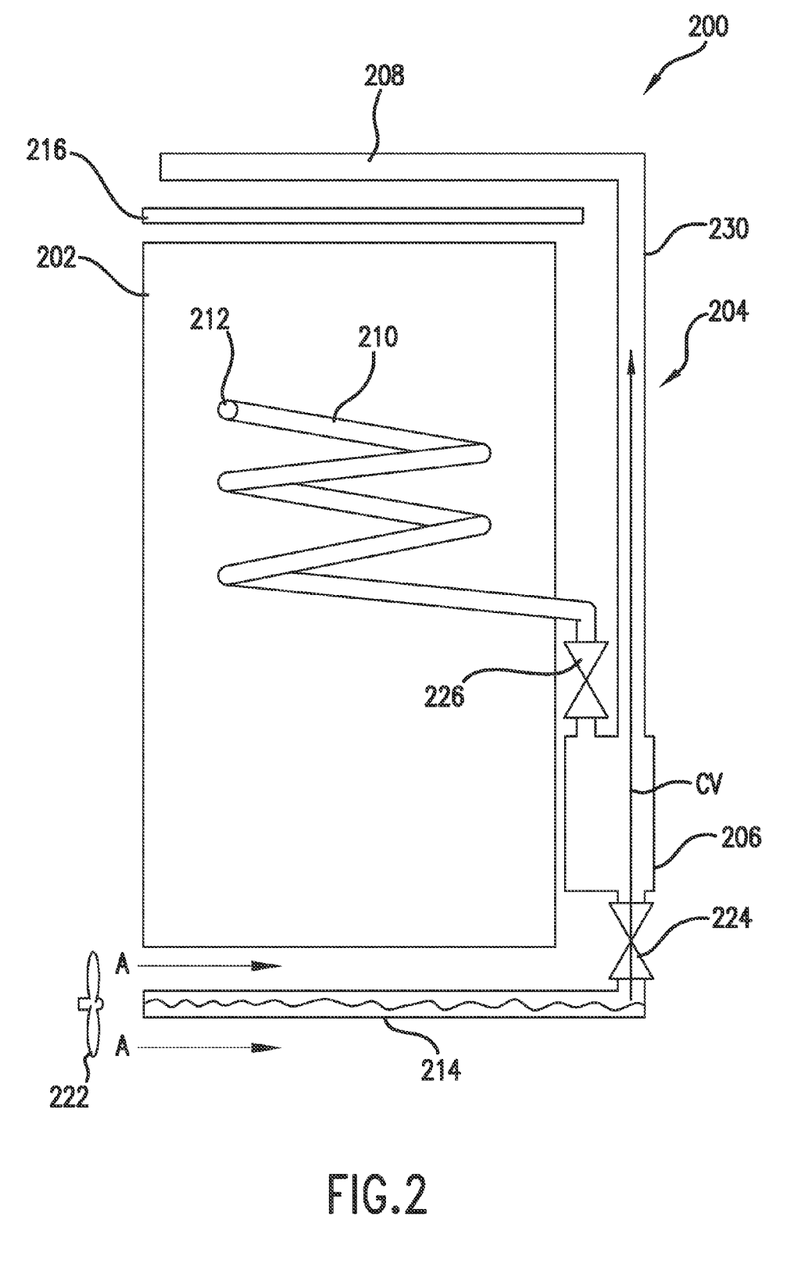

Referring now to FIGS. 1 and 2, water heater 200 includes tank 202 for holding the water to be heated. Tank 202 can be provided with insulation and a protective jacket (not shown) to contain insulation between tank 202 and the jacket as will be understood by one of skill in the art. Additionally, a water inlet and water outlet (not shown) can be used to connect tank 202 with the piping system of e.g., a commercial or residential structure for the receipt of water to be heated and for the return delivery of water heated while in tank 202.

Water heater 200 includes a sorption heat pump 204. FIG. 1 shows heat pump 204 in charging mode while FIG. 2 shows heat pump 204 in a discharge mode as will be further described. Heat pump 204 includes a regenerator 208 that includes a sorbate. As used herein, sorbate refers to material that can be combined with liquid or gas/vapor, referred to herein as a refrigerant, to create an exothermic reaction. Conversely, the sorbate can be heated to remove the refrigerant in an endothermic reaction. By way of example, the sorbate may be a salt such as lithium chloride or lithium bromide while the refrigerant may be water. Before the application of heat, heat pump 204 is at a near vacuum pressure condition. For example, the water and salt within heat pump 204 may be at a pressure of less than about 2 millibars.

During operation of water heater 200, a heat source is used to apply heat energy to regenerator 208. For the exemplary embodiment of FIG. 1, the heat source is provided as gaseous fuel burner 216 that is located proximate to regenerator 208 so that flames 218 from the combustion of a gaseous fuel will apply heat to regenerator 208 when heater 200 is in charging mode as shown in FIG. 1. Heating sources other than gaseous fuels may also be used in other embodiments of the present invention.

Gaseous fuel burner 216 can be selectively operated by e.g., a controller connected to an ignition mechanism and a valve (not shown) that controls the flow of gas to burner 216. As used herein, the controller may include a memory and one or more microprocessors, CPUs or the like, such as general or special purpose microprocessors operable to execute programming instructions or micro-control code associated with operation of water heater 200. The memory may represent random access memory such as DRAM, or read only memory such as ROM or FLASH. In one embodiment, the processor executes programming instructions stored in memory. The memory may be a separate component from the processor or may be included onboard within the processor. The controller may be positioned in a variety of locations throughout water heater 200. Accordingly, the controller can be used to activate burner 216 when water heater 200 is in charging mode so as to provide heat for the endothermic reaction needed to drive refrigerant vapor from the sorbate in regenerator 208.

Sorption heat pump 204 also includes a condensate collection chamber 206 that is in fluid communication with regenerator 208 by vapor channel 230. Heat pump 204 also includes a condenser 210 and an evaporator 214, both of which are also in fluid communication with condensate collection chamber 206. As shown by arrows V, during charging mode, refrigerant vapor desorbed from the sorbate travels to condensate collection chamber 206. A first valve 224 is in the closed position during the charging mode so as to prevent refrigerant vapor from travelling into evaporator 214. Instead, the refrigerant vapor travels into condenser 210 through a second valve 226 that is in an open position.

For this exemplary embodiment, condenser 210 is shown as a helical coil elevated along vertical direction V relative to the condensate collection chamber 206. A terminus 212 seals one end of condenser 210. Gaseous refrigerant can travel upwardly within condenser 210 and transfer heat into water in tank 202 and thereby increase the temperature of the water. As the refrigerant vapor condenses and transfers latent heat to water in tank 202, the vapor changes phase to a refrigerant liquid that travels under the force of gravity back to condensate collection chamber 206 as indicated by arrow C. The resulting refrigerant liquid or condensate is pooled in condensate collection chamber 206.

Figure 7:
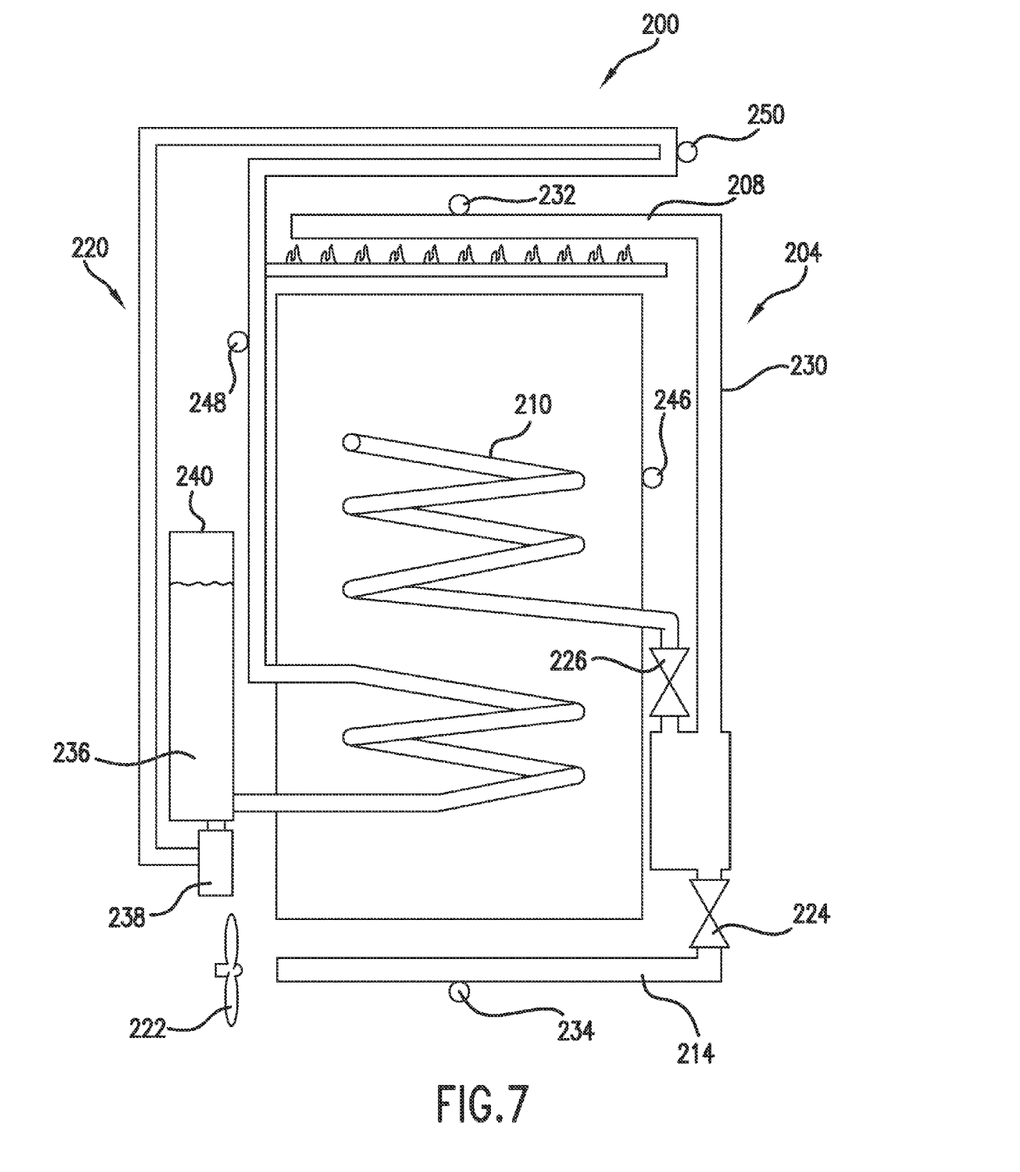
FIG. 7 illustrates the exemplary embodiment of a water heater shown in FIG. 1 and indicates exemplary positioning of various sensors as further described below.

FIG. 7 provides another schematic view of water heater 200 and illustrates the placement of certain sensors. As shown, a first temperature sensor 232 is used to measure the temperature at regenerator 208. During the charging stage when heat source 216 is applying heat to regenerator 208, an increase in temperature as measured by first temperature sensor 232 is used to indicate that the sorbate has been substantially regenerated to remove all or a substantial portion of refrigerant. Returning to FIG. 1, the controller can then turn off the heat source i.e., burner 216. Once the refrigerant vapor has been condensed, first valve 224 is then opened to allow condensate to drain under the force of gravity into evaporator 214.

Referring now to the discharge mode shown in FIG. 2, after condensate 228 has drained into evaporator 214, second valve 226 is closed, first valve 224 remains open, and a fan 222 is activated to move ambient air over evaporator 214. Fan 222 can be a blower or other air movement device configured to push or pull air over evaporator 214. The ambient air provides thermal energy that is transferred to the refrigerant liquid to provide the latent heat energy required for vaporization. As shown in FIG. 1 with arrow CV, the resulting vapor travels through the open first valve 224, through vapor channel 230, and back to regenerator 208 where is absorbed by the sorbate in an exothermic reaction. As shown in FIG. 7, a second temperature sensor 234 is positioned at evaporator 214 and is configured for measuring the temperature of evaporator 214. An increase in this temperature can be used to determine that the refrigerant liquid has been substantially or completely vaporized so that water heater 200 can be recycled to the charge mode.

Figure 3:
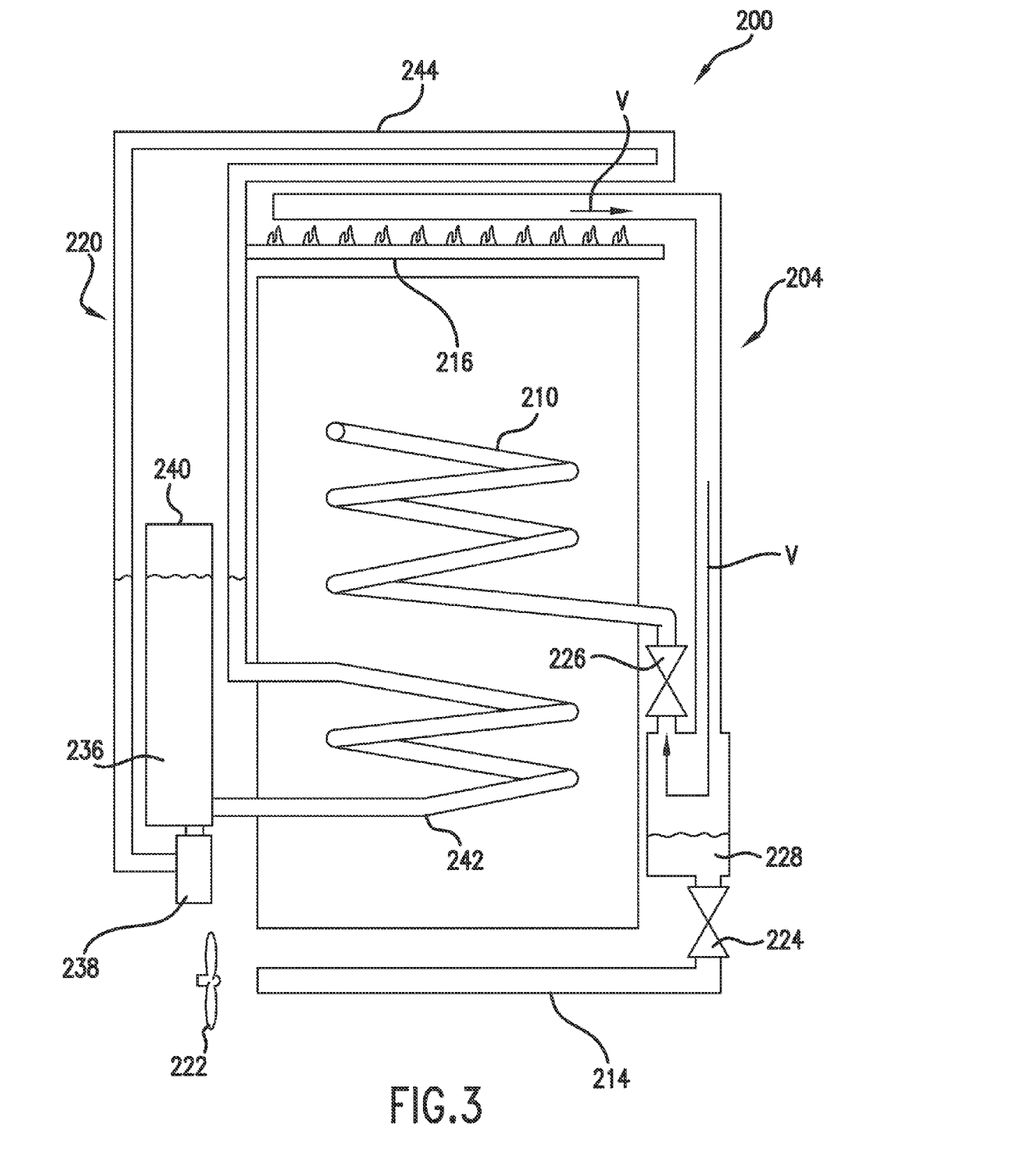
FIGS. 3 and 4 illustrate the exemplary embodiment of a water heater shown in FIGS. 1 and 2 along with an exemplary heat transfer loop.
Figure 4:
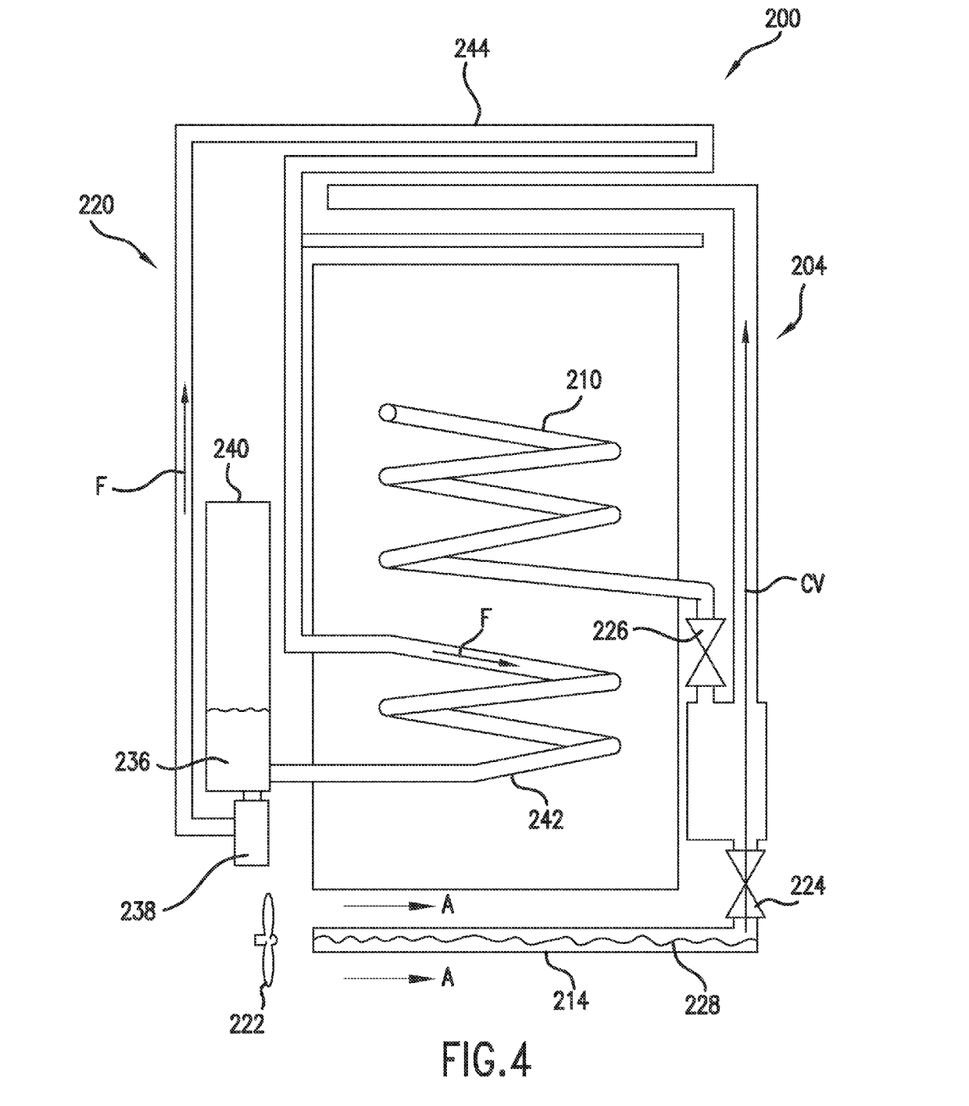

FIG. 3 illustrates water heater 200 in a charging mode as discussed above with regard to FIG. 1, while FIG. 4 illustrates water heater 200 in a discharging mode as discussed above with regard to FIG. 2. As shown, water heater 200 also includes a heat transfer loop 220 with a reservoir or holding tank 240 containing a heat transfer fluid 236 that can be circulated by pump 238. During charging mode when gas burner 216 is operating to provide heat to regenerator 208, pump 238 remains inactive and the heat transfer fluid remains in holding tank 240 under force of gravity. However, after gas burner 216 is deactivated, significant heat energy may still be present in or near regenerator 208 that can be used to provide heat to the water in tank 202.

Accordingly, referring to FIG. 4, pump 238 can be activated (by e.g., a controller) shortly after gas burner 216 is deactivated so as to capture and transfer this heat to water in tank 202. More specifically, heat transfer loop 220 includes a first heat exchanger 242 (shown as coils) in tank 202 for delivering heat energy to water in tank 202. A second heat exchanger 244 is positioned at regenerator 208 for receiving heat energy from regenerator 208, gas burner 216, or both. Pump 238 circulates heat transfer fluid 236 as shown by arrows F. Heat transfer fluid 236 may be e.g., water, oil, or another suitable medium.

In addition, during discharge mode, heat is provided by the exothermic reaction between returned vapor and the sorbate in regenerator 208. Heat transfer loop 220 is also used to capture this heat from regenerator 208 using second heat exchanger 244 and transfer the same to water in tank 202 using the first heat exchanger 242 and circulated heat transfer fluid 236 as previously described. Thus, heat transfer loop 220 can be used to capture and deliver residual heat remaining after burner 216 has been deactivated as well as heat from the exothermic reaction that occurs in regenerator 208 during discharge mode.

Turning now to FIG. 7, water heater 200 includes a third temperature sensor 246 positioned at tank 202 to measure the temperature of water in tank 202. A fourth temperature sensor 248 is positioned in heat transfer loop 220 at a position downstream of regenerator 208 and a fifth temperature is positioned at a position upstream of regenerator 208 at the inlet thereto. Temperature measurements provided by these temperature sensors can be used to determine when to activate and deactivate pump 238.

For example, by comparing the temperature measurements of water tank 202 from third temperature sensor 246 with measurements from fourth temperature sensor 248, the controller can determine whether to continue operating pump 238. If, for example, temperature of the heat transfer fluid 236 is cooler than the water in tank 202 by at least about 2° C., then pump 238 can be deactivated or remain in an off mode. Conversely, if the heat transfer fluid 236 is warmer than the water in tank 202 by about 2° C., then the controller can activate or continue operating pump 238 to heat water in tank 202. A difference of 2° C. is provided by way of example only—other values or ranges may be used as well. Additionally, by comparing the temperature readings between fourth temperature sensor 248 and fifth temperature sensor 250, the controller can determine whether the heat transfer fluid 236 is capturing heat energy from regenerator 208.

Figure 5:
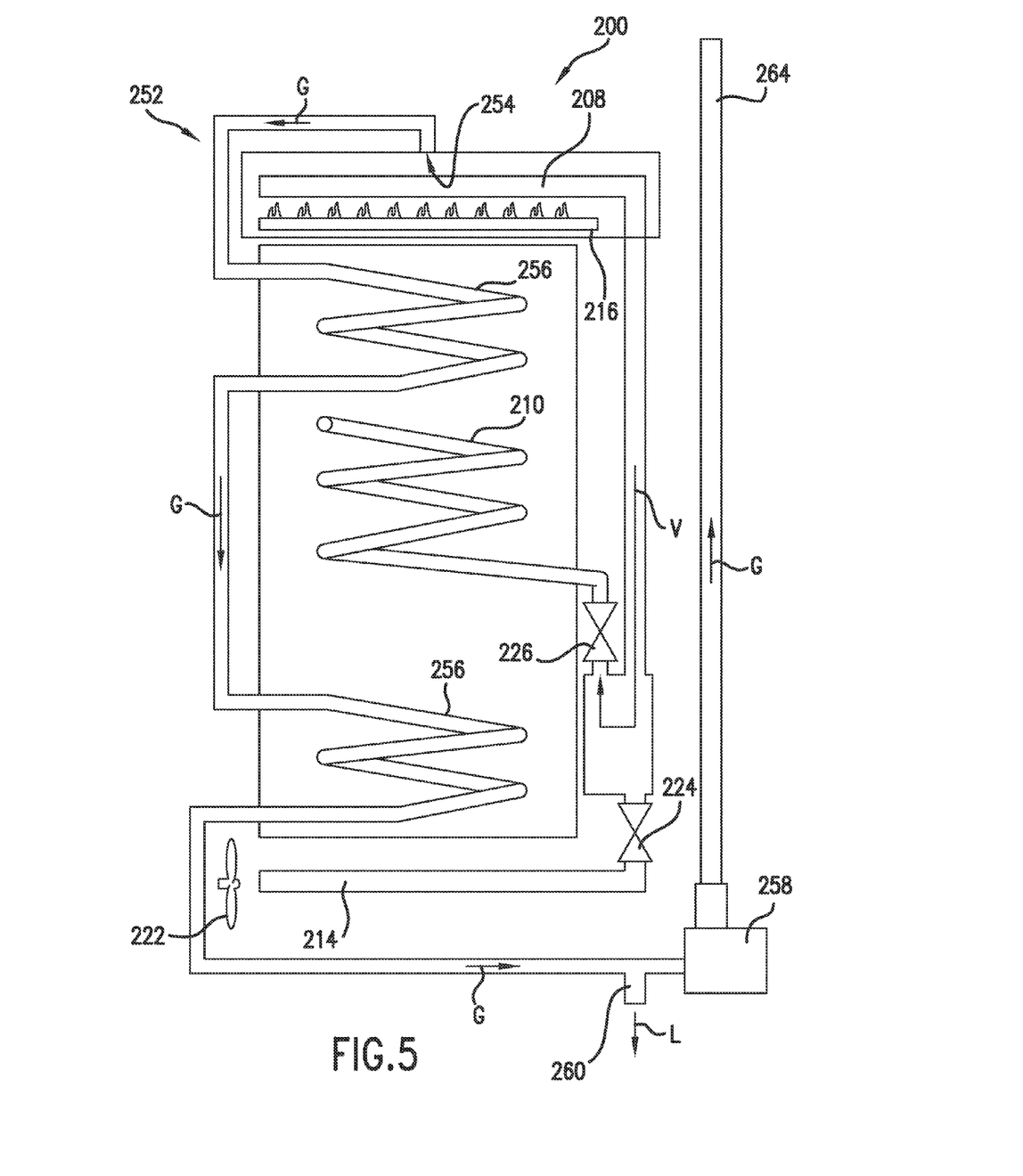
FIGS. 5 and 6 illustrate the exemplary embodiment of a water heater shown in FIGS. 1 and 2 along with an exemplary vent gas heat exchange system.
Figure 6:
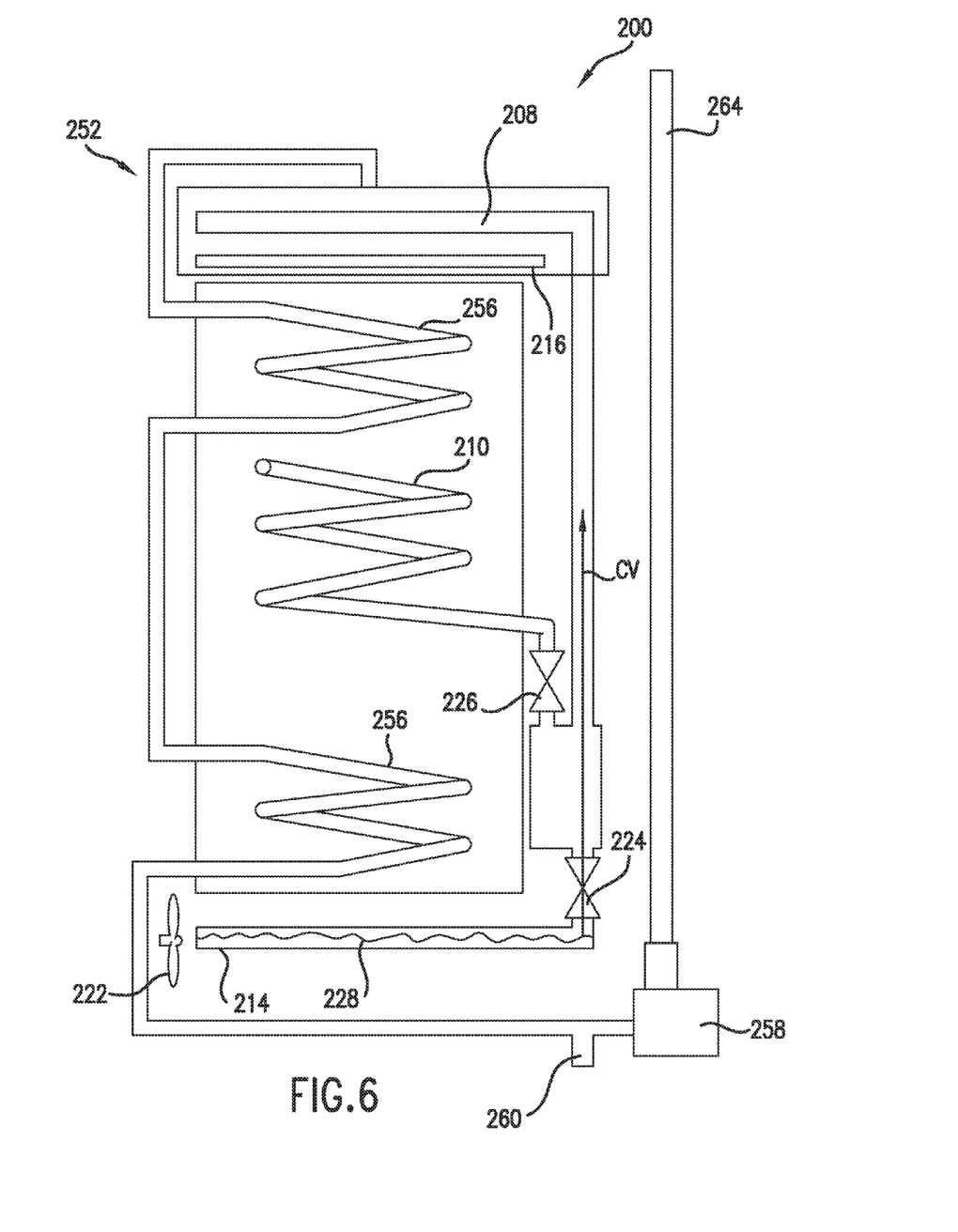

Water heater 200 is also provided with a vent gas heat exchange system 252 as shown in FIG. 5 (charge mode) and FIG. 6 (discharge mode). Where the heat source uses e.g., a combustible fuel to provide heat as with fuel burner 216, a significant amount of heat is still present in the combustion gases. Accordingly, heat transfer system 252 includes an inlet 254 for the intake of combustion gases from fuel burner 216, which are then fed (arrows G) to a vent gas heat exchanger 256 located in water tank 202. Vent gas heat exchanger 256 transfers heat from the vent gas to the water to raise its temperature. A fan or blower 258 is used to assist the flow of vent gas through heat transfer loop 252. A drain 260 allows water or other liquids L that condense as the vent gas is cooled to be removed. A flue or vent 264 provides for discharge of the vent gas after circulation through heat exchanger 256. During discharge mode as shown in FIG. 6, blower 258 is likely not operated unless heat can be captured from the exothermic reaction occurring in regenerator 208.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater, comprising:
   a tank for holding water;
   a sorption heat pump, comprising
      a recirculated refrigerant;
      a condensate collection chamber;
      a regenerator in fluid communication with said condensate collection chamber;
      a sorbate located in said regenerator;
      a condenser positioned in said tank and in fluid communication with said condensate collection chamber, said condenser configured for exchanging heat with water in said tank, said condenser also configured for providing condensed refrigerant to said condensate collection chamber;
      an evaporator in fluid communication with said condensate collection chamber, said evaporator configured for receiving condensed refrigerant from said condensate collection chamber and configured for returning vaporized refrigerant to said condensate collection chamber;
      a fan configured for selectively causing air to pass across said evaporator;
   a heat source positioned proximate to said regenerator and configured for selectively applying heat to said regenerator;
   a closed, recirculating heat transfer loop, comprising:
      a first heat exchanger positioned in said tank and configured for delivering heat energy to water in said tank;
      a second heat exchanger positioned proximate to said regenerator and said heat source and configured for receiving heat energy from said regenerator, said heat source, or both; and
      a pump for recirculating a heat transfer fluid between said first and second heat exchangers.

2. A water heater as in claim 1, comprising:
   a first valve in fluid communication with said evaporator and said condensate collection chamber and configured for selectively controlling the flow of a refrigerant between said evaporator and said condensate collection chamber.

3. A water heater as in claim 2, a second valve in fluid communication with said evaporator and said condenser and configured for selectively controlling the flow of a refrigerant between said evaporator and said condensate collection chamber.

4. A water heater as in claim 3, wherein said condenser comprises a coil located within said tank and having a terminus at one end, wherein said coil is elevated relative to said condensate collection chamber so as to allow condensate to drain from said coil and into said condensate collection chamber when said second valve is opened.

5. A water heater as in claim 1, further comprising a reservoir in thermal communication with said first heat exchanger and said pump, said reservoir configured for storing the heat transfer fluid and providing the heat transfer fluid for circulation in said heat transfer loop by said pump.

6. A water heater as in claim 1, where said heat source comprises a gaseous fuel burner.

7. A water heater as in claim 1, wherein said condensate collection chamber is elevated relative to said evaporator.

8. A water heater as in claim 1, wherein the sorbate comprises lithium bromide, lithium chloride, or both.

9. A water heater as in claim 8, wherein the refrigerant comprises water.

10. A water heater as in claim 1, further comprising:
a first temperature sensor positioned at said regenerator and configured to sense the temperature at said regenerator.

11. A water heater as in claim 10, further comprising:
a second temperature sensor positioned at said evaporator and configured to sense the temperature at said evaporator.

12. A water heater as in claim 11, further comprising:
a third temperature sensor positioned at said water tank and configured to sense the temperature of water in said water tank.

13. A method of operating a water heater, the water heater having a tank for holding water, a regenerator for a sorbate, and an evaporator, the method comprising:
applying heat to the regenerator so as to heat a solution containing the sorbate and provide a refrigerant vapor;
exchanging heat between the refrigerant vapor and water in the tank so as to increase the temperature of water in the tank;
condensing the refrigerant vapor into a refrigerant liquid;
draining the refrigerant liquid under force of gravity to the evaporator;
vaporizing the refrigerant liquid in the evaporator to provide a refrigerant vapor by exchanging heat energy between the refrigerant liquid and ambient air;
combining the refrigerant vapor from said step of vaporizing with the sorbate so as to regenerate the sorbate solution by an exothermic reaction;
circulating a heat transfer fluid during between the regenerator and the water tank after said step of applying and during said step of combining;
terminating said step of circulating when the difference in temperature between the heat transfer fluid and the water in the tank is less than a predetermined temperature difference; and
activating a fan during said vaporizing step so as to create an ambient air flow over the evaporator.

14. A method of operating a water heater as in claim 13, further comprising the step of sensing the temperature of the water and the heat transfer fluid so as to determine when to execute said step of terminating.

15. A method of operating a water heater as in claim 13, wherein said refrigerant liquid comprises water.

16. A method of operating a water heater as in claim 13, wherein said predetermined temperature difference is about 2° C.

17. A water heater, comprising:
a tank for holding water;
a sorption heat pump, comprising
a recirculated refrigerant;
a condensate collection chamber;
a regenerator in fluid communication with said condensate collection chamber;
a sorbate located in said regenerator;
a condenser positioned in said tank and in fluid communication with said condensate collection chamber, said condenser configured for exchanging heat with water in said tank, said condenser also configured for providing condensed refrigerant to said condensate collection chamber;
an evaporator in fluid communication with said condensate collection chamber, said condensate collection chamber being elevated relative to said evaporator, said evaporator configured for receiving condensed refrigerant from said condensate collection chamber and configured for returning vaporized refrigerant to said condensate collection chamber;
a heat source positioned proximate to said regenerator and configured for selectively applying heat to said regenerator;
a closed, recirculating heat transfer loop, comprising:
a first heat exchanger positioned in said tank and configured for delivering heat energy to water in said tank;
a second heat exchanger positioned proximate to said regenerator and said heat source and configured for receiving heat energy from said regenerator, said heat source, or both; and
a pump for recirculating a heat transfer fluid between said first and second heat exchangers.

18. A water heater as in claim 17, further comprising a reservoir in thermal communication with said first heat exchanger and said pump, said reservoir configured for storing the heat transfer fluid and providing the heat transfer fluid for circulation in said heat transfer loop by said pump.

19. A water heater as in claim 17, comprising:
a first valve in fluid communication with said evaporator and said condensate collection chamber and configured for selectively controlling the flow of a refrigerant between said evaporator and said condensate collection chamber.

20. A water heater as in claim 19, a second valve in fluid communication with said evaporator and said condenser and configured for selectively controlling the flow of a refrigerant between said evaporator and said condensate collection chamber.

* * * * *